Aug. 19, 1941.                A. TANGEN                 2,253,148
                       POWER TAKE-OFF MECHANISM
                         Filed May 31, 1939            2 Sheets-Sheet 1
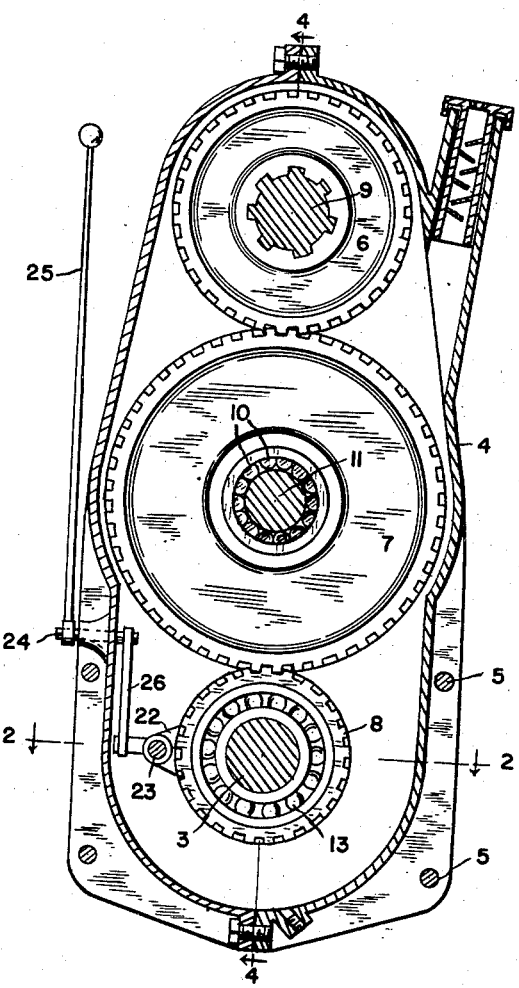
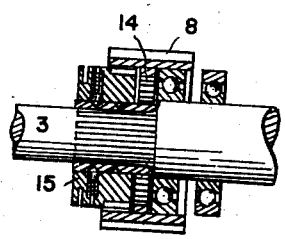
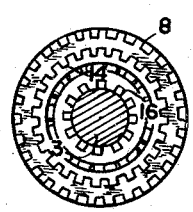
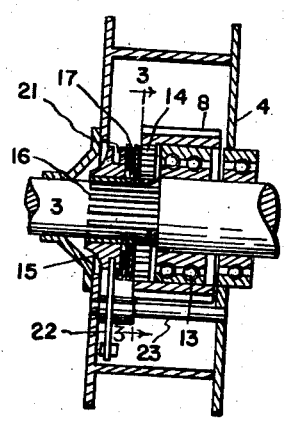
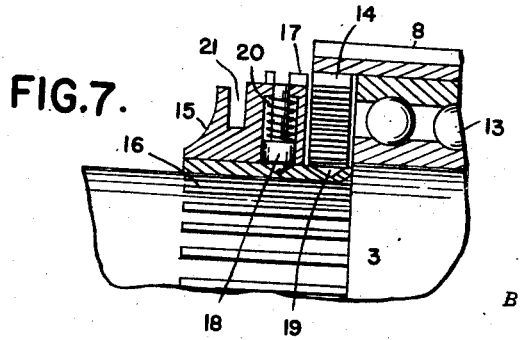
INVENTOR.
ANTHONY TANGEN
BY John C. Alexander
ATTORNEYS Aug. 19, 1941.   A. TANGEN   2,253,148
POWER TAKE-OFF MECHANISM
Filed May 31, 1939   2 Sheets-Sheet 2

INVENTOR.
ANTHONY TANGEN
BY John C. Alexander
ATTORNEYS

Patented Aug. 19, 1941

2,253,148

UNITED STATES PATENT OFFICE 2,253,148

POWER TAKE-OFF MECHANISM

Anthony Tangen, Detroit, Mich.

Application May 31, 1939, Serial No. 276,493

2 Claims. (Cl. 74—11)

This invention relates to power take-off mechanisms such as adapt a motor vehicle power plant to serve various purposes other than vehicle propulsion. The present construction is a further improvement on the subject matter of my Patent #2,033,597 issued March 10, 1936.

Objects of the invention are to provide an improved clutch connection for establishing or cutting off an application of power to a take-off mechanism, and to particularly adapt a clutch to occupy a minimum space as measured along the clutch axis.

These and various other objects are attained by the construction hereinafter described and illustrated in the accompanying drawings, wherein:

Fig. 1 is a vertical sectional view of the power take-off unit, taken on the line 1—1 of Fig. 5.

Fig. 2 is a horizontal sectional view of the same, taken on the line 2—2 of Fig. 1.

Fig. 3 is a sectional view taken on the line 3—3 of Fig. 2 and showing a gear equipped with clutch teeth.

Fig. 6 is a diametrical sectional view of the primary driving gear of the unit, showing the driving position of a clutch associated with such gear.

Fig. 7 is a fragmentary enlarged view of a portion of Fig. 2 particularly showing a provision for holding the sliding member of the clutch in either of its limiting positions.

Figure 4:
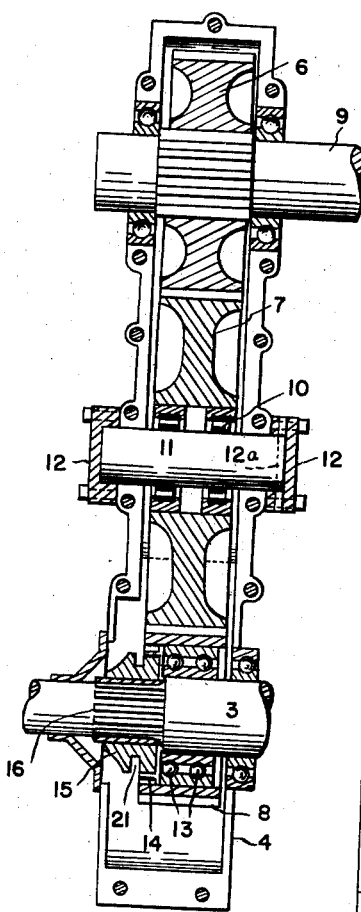
Fig. 4 is a vertical sectional view of said unit, the section being taken on line 4—4 of Fig. 1.
Figure 5:
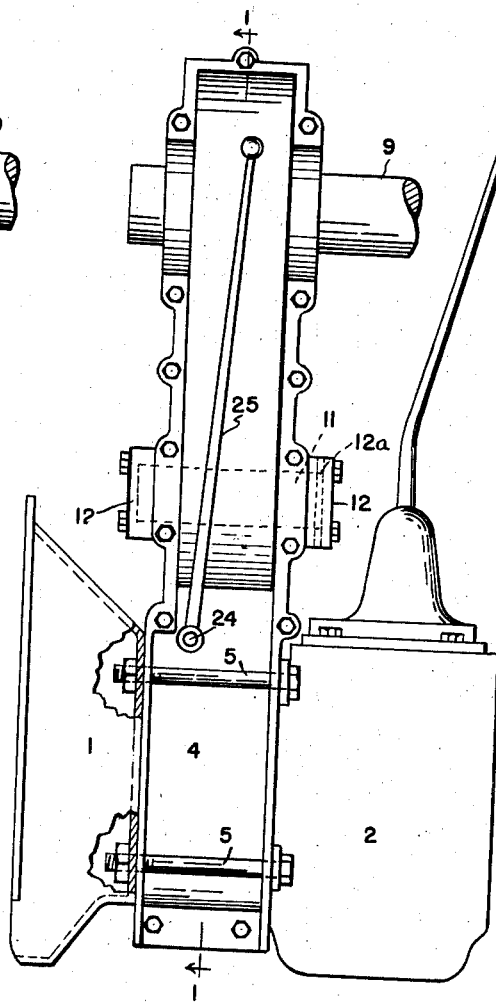
Fig. 5 is a side elevation of the unit in its installed relation to the clutch and transmission casings of a vehicle.

In these views, the reference characters 1 and 2 (see Fig. 5) designate respectively the usual clutch and transmission casings of a motor vehicle which, as originally assembled, (not shown) are bolted together in a rigidly abutting relation. In installing my power take-off unit, said casings are shifted apart a few inches, and a replacement shaft 3 of the necessary additional length is substituted for the shaft originally driving the transmission gearing (not shown) from the clutch (not shown). Snugly inserted between the casings 1 and 2 is the casing 4 of my power take-off unit, the latter being so vertically elongated as to project considerably above the casings 1 and 2. Bolts 5 employed to rigidly interconnect the casings 1, 2 and 4 may be fitted in openings of the casings 1 and 2 provided for the originally installed bolts. Housed within the casing 4 is a train of gears 6, 7, and 8, disposed one above another, the uppermost gear 6 being splined or otherwise fixedly mounted on a power take-off shaft 9. The intermediate gear 7 is journaled through suitable anti-friction elements 10 on a shaft 11, restrained from rotation in any desired manner, as by a pin 12a carried by one of a pair of caps 12 bolted to the casing 4 at the ends of said shaft. The lowermost gear 8 is journaled on the shaft 3 through a suitable anti-friction bearing 13, and is formed adjacent to an end face of such gear and at one end of said anti-friction bearing, with a set of interior clutch teeth 14. Adjacent to said end face of the gear 8 a collar 15 is slidingly mounted on and driven by the shaft 3, as by splines 16, said collar being formed with a set of exterior clutch teeth 17 for meshing with the teeth 14. One or more detents 18 (two being shown) are mounted in the collar 15, for engagement in the limiting positions of said collar with shallow conical sockets 19 formed in the shaft 3. Said detents are preferably pins radially slidable in the collar and each adapted to be yieldably held engaged in one or the other of the sockets 19 by a coiled spring 20. For shifting said collar to either limiting position, it is formed with an annular groove 21 accommodating a suitable shifter yoke 22 slidable on a rod 23 parallel to the shaft 3 and at one side of the collar 15. A rock-shaft 24 journaled in the casing 4 is actuable by a hand lever 25, exterior to said casing, and rigidly carries an arm 26 within the casing operatively engaging the shifter yoke.

In operation of the described mechanism, when the collar 15 is in its position shown in Fig. 7, the two sets of clutch teeth are disengaged, and power delivered to the shaft 3 is transmitted in a well-known manner to effect a propulsion of the vehicle. When said collar is in its other limiting position, as in Fig. 6, the two sets of clutch teeth intermesh and the gear train 8, 7 and 6 transmits a drive to the power take-off shaft 9. The elevated position of the latter facilitates employment of any desired connection for applying power from such shaft.

A mechanism of the described character has numerous possible uses, as for example, in driving electric welding outfits, air compressors, blowers, pumps, refrigerating mechanism, saws, grinders, and hoists.

The described clutch is of simple, strong and reliable construction and presents the advantage, as applied to the gear 8, that the gear train is idle and relieved of wear, when the shaft 3 is utilized only for vehicle propulsion purposes.

It is to be noted that the casing 4 must have a minimum thickness owing to the usual confined location of the entire installation, and consequently the clutch must be of a nature to occupy a minimum length of the drive shaft. The clutch described is of a type particularly designed to minimize its working extent lengthwise of the drive shaft.

The invention is presented as including all such modifications and changes as come within the scope of the following claims.

What I claim is:

1. In a power take-off, the combination with the clutch and transmission casings of a motor vehicle, of a third casing snugly fitted between and projecting above the two first-mentioned casings, a power take-off shaft journaled in the upper portion of the third casing, a drive shaft extending through the third casing, and establishing a drive connection from the clutch to the transmission, a train of gears in the third casing driving the power take-off shaft from the drive shaft, the initial gear of such train being journaled on the drive shaft to afford free rotation of such shaft within said gear, a clutch within the said third casing including a collar slidable on and driven by the drive shaft to make or break a drive connection to said initial gear, and a lever exteriorly mounted on the third casing and controlling the clutch, and means reacting between said shaft and collar for yieldably retaining the collar in either its idle or driving position.

2. In a power take-off as set forth in claim 1, said initial gear having an interior set of clutch teeth, a detent set into a socket of the slidable collar opening in the area occupied by the clutch teeth of said collar, and means yieldably urging said detent toward the drive shaft, the latter having a pair of sockets alternatively yieldably receiving said detent accordingly as the collar is at one or the other of its limiting sliding positions.

ANTHONY TANGEN.